United States Patent

[11] 3,630,692

| [72] | Inventors | Raymond C. Green;<br>Joseph E. Trachta, both of Hobbs, N. Mex. |
|---|---|---|
| [21] | Appl. No. | 700,988 |
| [22] | Filed | Jan. 26, 1968 |
| [45] | Patented | Dec. 28, 1971 |
| [73] | Assignee | Kerr-McGee Corporation |

[54] METHOD OF PRODUCING LARGE KCl CRYSTALS
5 Claims, 1 Drawing Fig.

| [52] | U.S. Cl. | 23/302,<br>23/301 |
|---|---|---|
| [51] | Int. Cl. | B01d 9/02 |
| [50] | Field of Search | 23/295,<br>296, 298, 301, 302, 273; 159/45 |

[56] References Cited
UNITED STATES PATENTS

| 1,559,703 | 11/1925 | Howard | 23/301 |
|---|---|---|---|
| 1,945,281 | 1/1934 | Leithauser | 159/45 |
| 2,737,451 | 3/1956 | Saeman | 23/302 |
| 2,795,487 | 6/1957 | Otto | 23/273 |

OTHER REFERENCES
Saeman, A.I.Ch.E. Journal March 1956 page 107–112

*Primary Examiner*—Norman Yudkoff
*Assistant Examiner*—S. Silverberg
*Attorney*—William G. Addison ABSTRACT: A method of increasing the size of crystals produced in a crystallizing vessel having a bed of growing crystals suspended therein. Live steam is added to the solution within the crystallizing vessel at a point above the bed of growing crystals to dissolve a major portion of the fines which are circulating in the solution.

PATENTED DEC 28 1971
3,630,692
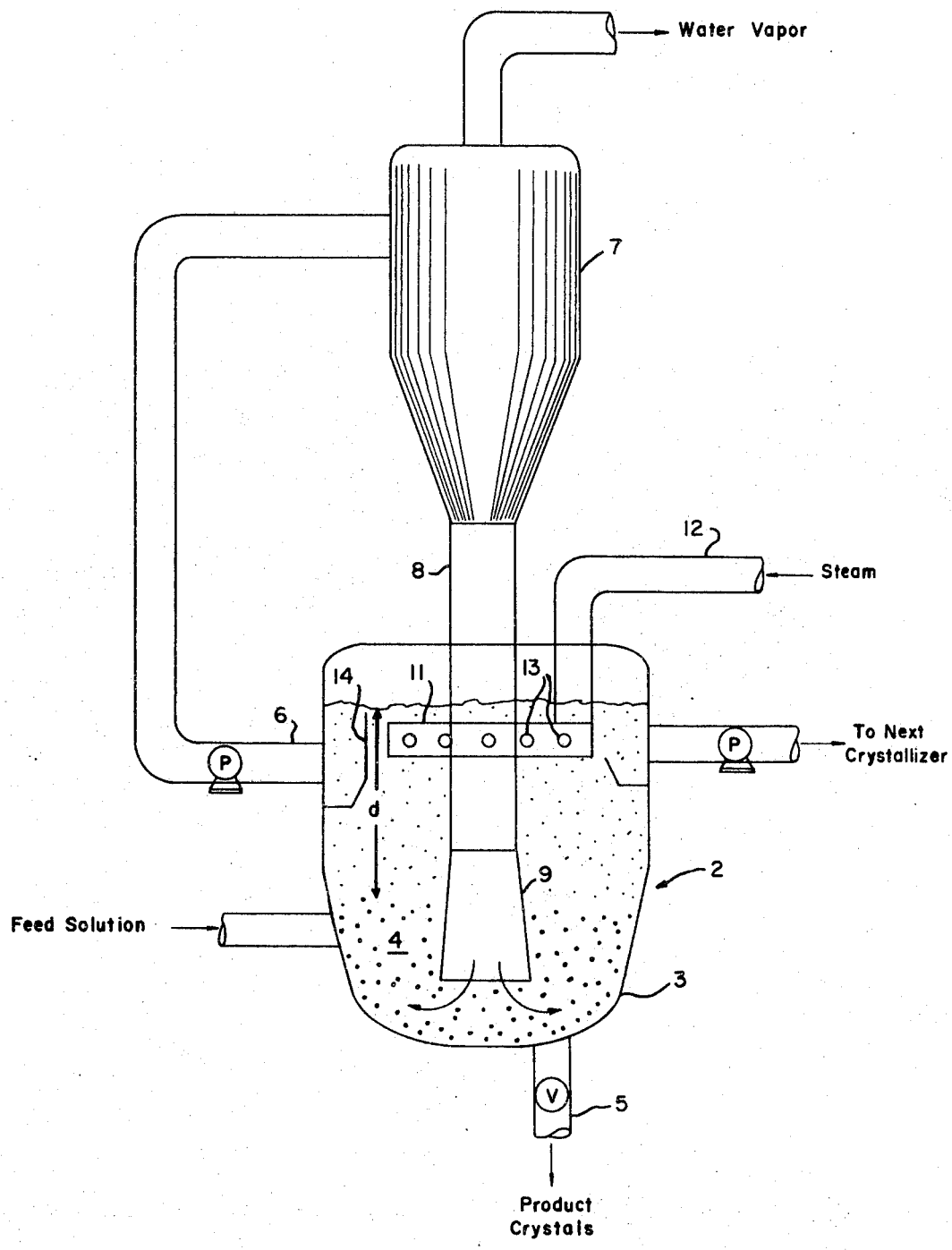
Raymond C. Green
Joseph E. Trachta
INVENTOR.
BY Richard W. Collins
Attorney

METHOD OF PRODUCING LARGE KCl CRYSTALS

BACKGROUND OF THE INVENTION

This invention relates to a method of producing crystals of inorganic salts from aqueous solutions, and more particularly to a method of improving the product size distribution of crystals from such solutions involving adding steam to a crystallizing vessel at a selected location to dissolve small crystals and thereby increase the proportion of larger crystals produced.

It is common knowledge in the art of crystallization of solids, such as inorganic salts, from aqueous solutions to form and maintain a bed of suspended crystals within a zone in a crystallizing vessel. Such processes may be batch type, but on a commercial scale are generally continuous, and may involve more than one crystallizing vessel in series, with a portion of the desired crystal product coming from each of the series of crystallizing vessels. The suspension of growing crystals is generally maintained by some manner of upward flow of liquid in the vessel, and in many cases solution is withdrawn from an upper zone of the vessel and reintroduced at a lower zone in the vessel. This withdrawn solution is passed to an evaporator prior to reintroduction into the vessel, and the evaporation of liquid from the solution tends to cool and saturate or supersaturate the solution so that upon reintroduction in a zone of growing crystals the solution will have an increased potential for giving up dissolved material to the growing crystals.

In the production of crystalline chemical fertilizers, and particularly potash, the larger crystals, such as +14 mesh size, being a higher price, and are more in demand, than the smaller sizes. As is well known in the crystallization art, for a given rate of crystal production the size of the product crystals is inversely proportional to the number of growing crystals. It is, therefore, a desideratum that the number of new crystals, or nuclei, which are formed, in a given time period be approximately equal to the number of product crystals removed during the time period. It is very difficult in actual practice to accurately control the number of nuclei formed, and in addition there will be an increase in the number of particles due to attrition and collision among crystals in the suspension.

Several methods of controlling the number of particles in a crystallizing zone have been utilized, with varying degrees of success. One such method involves drawing off a portion of the small crystals which invariably are found above the main bed of suspended growing crystals. These small crystals may be redissolved and the solution returned to the crystallizing system, or in some cases there is a demand for the finely divided product as such. An example of this method which has been used with some success in the past is described in U.S. Pat. No. 2,737,451. This method involves removing a stream from the upper zone of a crystallizer vessel, passing the stream to a separate tank, adding steam to the tank to dissolve crystals, and then returning the stream to the lower zone of the crystallizer vessel where the dissolved material will tend to grow on the larger crystals suspended in the lower zone. Disadvantages of this system are that additional equipment and operating steps are required, and only a small portion of the solution above the bed of suspended crystals is treated in a given time.

SUMMARY OF THE INVENTION

According to the present invention, the size of crystals produced in a suspended bed of growing crystals is enhanced by adding a fluid providing dissolving capacity for the crystals, such as steam, to the solution at a point above the crystal bed. Addition of steam at this point dissolves smaller crystals which are carried over from the bed, or which form as nuclei in the zone above the crystal bed. While the amount of material making up these small crystals or nuclei is generally quite small, the number of particles is often tremendously large, and if this large number of small particles is returned to the growing zone containing larger crystals, the total surface area of the small particles might actually be many times that of the desired larger crystals. This means that most of the growth would take place on the smaller particles, and the result would be that the suspended bed would contain so many growing particles that very few of them could achieve the desired size, and the resultant product would not have the desired average particle size.

It is accordingly an object of this invention to provide a method of producing large crystals from a solution containing a desired dissolved material.

Another object of this invention is to provide a method of producing large crystals from a solution containing a desired dissolved material by controlling the number of small crystals within a bed of suspended growing crystals.

Another object is to reduce the number of small particles recirculated to a suspension of growing crystals, thereby enhancing the average size of product crystals.

BRIEF DESCRIPTION OF THE DRAWING

The FIGURE is an elevational view of crystallizing apparatus which can be used to carry out the invention.

DESCRIPTION OF THE PREFERRED EMBODIMENT

A preferred embodiment is described below for a case where large crystals of potassium chloride are produced from a solution of potassium chloride and sodium chloride in a crystallizing vessel designed to maintain a suspended bed of growing crystals therein and having provisions for withdrawing solution from a level in the vessel above the suspended bed, passing the withdrawn solution through an evaporation step, and then returning the solution to the crystallizing vessel.

It is understood that the following description is for purposes of illustrating the invention, and is not to be considered as limiting the same, reference being had to the appended claims for this purpose.

As shown generally by the FIGURE, crystallizing vessel 2 has a lower zone 3 which is designed to maintain a suspended bed 4 of growing crystals therein. Product draw off means 5 is provided for continuously or periodically removing product crystals from suspended bed 4 in a conventional manner.

The level of solution in the crystallizing vessel 2 is maintained a distance $d$ above the suspension of growing crystals, and solution is withdrawn through conduit 6 and passed to evaporator 7 where some water is vaporized and removed, thereby providing some supersaturation to the solution, partly from water removal and partly from cooling. Some new crystals may form as a result of this evaporation and cooling, but generally the solution will hold the supersaturation until it has been passed through downcomer 8 and out from the flared portion 9 thereof into the lower portion of the crystallizer vessel. This solution then flows upwardly at a selected velocity to maintain a predetermined size of crystal in suspension in the bed 4. The upper level of the bed portion is not exactly uniform due to turbulence, but in practice is easy to maintain a rather well-defined upper boundary of the suspended bed.

Some nuclei will form within the suspended bed, but most of these will be swept up out of the suspended bed before they grow to a size that will be retained therein. These nuclei will either be dissolved as described more fully below, or they will recirculate through the system until they have grown to a size sufficient to be retained in the suspended bed. Desirably the number of nuclei allowed to grow and be retained in the suspended bed in a given time is approximately equal to the number of product crystals withdrawn.

Product crystals are withdrawn through draw off means 5. While not shown as such in the FIGURE, the draw off means might be an elutriation leg, which due to the upward flow of fluid therethrough only allows crystals of a predetermined minimum size to pass.

It is virtually impossible to control a crystallizer to the point where the number of nuclei formed and circulated equals the number of product crystals withdrawn, and some provision must be made to remove or dissolve most of the nuclei formed. Otherwise, the number of small particles circulating through the system, including through the growing zone or suspended bed, will be too high, resulting in growth of an excess number of inadequately sized crystals.

In accordance with a preferred embodiment of this invention, distribution means 11 is provided on conduit 12 and located within the crystallizing vessel at a level between the top of the suspended bed and the level from which recirculation solution is withdrawn. A trough 14 is provided in front of the opening between the vessel 2 and conduit 6 to assure that the recirculation fluid is taken from the uppermost level of solution in the vessel. Live steam is injected via conduit 12 through openings 13 in distribution means 11. This results in partial or complete dissolution of the small crystals being carried by the solution at this level in the vessel, and tends to completely dissolve the smaller particles, due to the high surface area of the smaller particles per unit weight compared to the larger crystals.

The proper amount of steam to be added can be readily determined, with the result that the suspended bed of crystals contains an optimum number and size distribution of crystals for the desired product.

It has been found that the process of this invention is much more effective than the conventional methods of controlling the fines in a crystallizer. While the actual reasons for the unexpected success of the method of this invention may not be completely understood, it is believed that it is due to the more effective utilization of the added steam due to its being distributed throughout a much larger portion of the solution than is the case where a separate fines removal tank is used. When a separate tank is used, it is obvious that only a small part of the solution can be treated, and most of the steam is used dissolving larger particles in the tank, whereas in the method of this invention most of the dissolving power of the added steam can act on the smallest particles present.

To illustrate the improvement in crystal product size when using the process of the invention compared to the prior art method of dissolving fines in a separate tank, the following comparison was made.

A commercial crystallizer system having a capacity of 1,500 tons per day of potassium chloride consists of five crystallizer vessels in series. A brine saturated with potassium chloride and sodium chloride at about 220° F. was passed to the first vessel, where some potassium chloride is produced on cooling to about 190° F. As is well known, potassium chloride crystallizes from a solution of potassium chloride and sodium chloride on cooling, as the solubility of potassium chloride decreases with a decrease in temperature, while the solubility of sodium chloride does not. The solution advances through each of the series of five crystallizers, eventually emerging as a saturated brine at about 90° F. When using the prior art technique of dissolving fines in a separate dissolving tank, the percentage of product crystals having a size of +14 mesh was averaging 39 and 17 percent respectively for the fourth and fifth crystallizers. The fines dissolving tanks on these crystallizers were shut down, and about 3,000 pounds per hour of 225 p.s.i. saturated steam was injected into each of the fourth and fifth crystallizers at a level between the top of the suspended bed of crystals and the level at which recirculation solution was withdrawn. Within 2 days the percentage of product crystals having a size of +14 mesh had risen to 84 and 78 percent respectively for the fourth and fifth crystallizers. Similar improvement was noted when 1,500 pounds per hour of 225 p.s.i. saturated steam was injected into the first and second crystallizers, although the problem is more acute, and therefore the improvement more dramatic, when the method of this invention is applied to the cooler, or downstream, units of the crystallizing system.

We claim:

1. In a process of producing crystals of a desired material from an aqueous solution of the material in which at least a portion of the aqueous solution containing fines and a bed of growing crystals of the desired material suspended therein is maintained within a crystallizing vessel, and
   a portion of said aqueous solution is withdrawn, passed to an evaporator and returned to said crystallizing vessel;
   the improvement comprising introducing into the crystallizing vessel in a region above said suspended bed of growing crystals and below the level at which said aqueous solution is withdrawn, a fluid providing dissolving capacity for the desired material to thereby dissolve a major portion of said fines of said desired material.

2. The process of claim 1 wherein at least a part of said fluid is steam.

3. The process of claim 2 wherein said desired material is potassium chloride.

4. The process of claim 3 wherein said aqueous solution is saturated with respect to potassium chloride and sodium chloride.

5. The process of claim 4 wherein said crystals are produced from a plurality of crystallizing vessels arranged in series, and said steam is added to at least two of said plurality of crystallizing vessels.

* * * * *